BEST AVAILABLE COPY

UNITED STATES PATENT OFFICE.

Re 500

EDWARD HOWELL, OF ASHTABULA, OHIO.

PROCESS FOR REMOVING PHOTOGRAPHS FROM GLASS TO PAPER.

Specification forming part of Letters Patent No. 17,330, dated May 19, 1857; Reissue No. 500, dated September 22, 1857.

*To all whom it may concern:*

Be it known that I, EDWARD HOWELL, of Ashtabula, in the county of Ashtabula and State of Ohio, have invented new and useful improvements in transferring the collodion film from glass to paper or other substance in the ambrotype process of taking pictures; and I do hereby declare that the following is a full and exact description thereof.

The nature of my invention consists in applying to the glass plate a coating or film of beeswax, or its equivalent, upon which the collodion film is flown as for ambrotypes, instead of flowing the collodion directly upon the glass plate. As in the usual ambrotype process the sensitive preparations will not penetrate the coating of beeswax or its equivalent. Consequently, after the picture is perfected upon the prepared plate of glass, it can be readily transferred from the glass to the paper or any other similar substance without the employment of chemical solvents to separate the collodion film from the glass after the picture has been completed. After my improved process it can be transferred by applying a suitable kind of paper to the back of the picture, and causing it to adhere by means of japan, prepared oil, or other similar substance.

In my improvement the following is the process adopted: I first thoroughly clean the plate of glass to be used in taking the picture. I then warm it sufficiently to melt beeswax, stearine, or other hydrocarbon compounds which are their chemical equivalents. The substance thus allowed to flow over the surface is spread evenly and thinly over the plate of glass by means of a small strip of daguerreian cotton drawn tightly upon a block of wood of convenient size. This coating of beeswax, or its equivalent, should be as thin and even as possible and free from any dust or fibers of cotton. When cool it is prepared for taking the picture by flowing over the surface of the coating upon the glass a film of collodion, and otherwise preparing and rendering the plate sensitive by means of the ordinary use of sensitive preparations, commonly known as "chemicals." The picture is then taken in the usual way and developed, washed clean, and dried. I then produce the best possible effect by the use of dry colors applied directly upon the collodion film. I now flow over all a coating of japan or prepared drying-oil varnish, or their equivalents, which permanently secures the colors. When this has become sufficiently dry to not adhere to the fingers by slight pressure, but still not perfectly dry, I take a piece of glazed black paper, or any other color to suit the nature of the picture or the fancy of the operator, and, having cut it to the size of the glass plate, saturate it perfectly with water. Now, by placing this paper upon the last partially-dried coat of varnish, I cause it to adhere to every part by means of pressure with a soft elastic roller. When the moisture has evaporated from this paper it will be found that a strong adhesion has taken place between the last coat of varnish and the paper, sufficiently so to enable the operator to remove the whole picture from the glass by the separation of the beeswax, or its equivalent, from the surface of the glass plate, producing, in fact, a colored photograph upon paper. The very thin film of wax, or its equivalent, that adheres to the surface of the picture produces upon it a very brilliant and pleasing effect.

The advantages of my improvement are, first, in the safety from injury to the other materials used in the process; secondly, in the safety and ease in removing the picture from the glass plate without the use of water, spirits of wine, or any other substance; third, in the protection offered to the surface of the picture by the beeswax, or its equivalent, without injury to the picture, but, on the contrary, tending directly to improve its tone; fourth, in the perfection of the picture immediately upon its removal from the glass plate without the addition of color or the removal of any substance from the surface and its consequent freedom from any veiled appearance.

My mode of transfers differs from all other modes by the use of beeswax, or its equivalent, other modes being in the use of dissolved gums or other substance requiring the use of water, spirits of wine, or other solvents to remove the picture from the plate of glass. In other modes, after the transfer has been effected, it is necessary to remove extraneous matter from the surface of the picture. In my improved mode nothing of the kind is required.

RE00500
OR IN 156/239

What I claim as my improvement, and desire to secure by Letters Patent, is—

The herein-described use of beeswax, or its equivalent, laid upon the surface of the glass plate previous to applying the collodion film, chemicals, and colors, as herein described, for the purpose of facilitating the removal of the picture, together with the manner of causing the backing paper to adhere to the finished picture, thus giving it strength to overcome the adhesion of the wax, or its equivalent, to the plate of glass, in the manner specified.

EDWARD HOWELL.

Witnesses:

N. HUBBARD,

C. BOOTH.